United States Patent [19]

Bianco et al.

[11] Patent Number: 5,617,814

[45] Date of Patent: Apr. 8, 1997

[54] METHOD OF AND APPARATUS FOR TRAINING AN ANIMAL

[75] Inventors: Frank J. Bianco, Pembroke Pines; Lance Ehren, Bay Harbor, both of Fla.

[73] Assignee: Elexis Corporation, Miami, Fla.

[21] Appl. No.: 2,486

[22] Filed: Jan. 8, 1993

[51] Int. Cl.⁶ ............................................. A01K 29/00
[52] U.S. Cl. ............................................. 119/720
[58] Field of Search ........................... 119/908, 719, 119/720, 721; 340/573

[56] References Cited

U.S. PATENT DOCUMENTS

| | | |
|---|---|---|
| 2,741,224 | 4/1956 | Putnam . |
| 2,800,104 | 7/1957 | Cameron et al. . |
| 2,996,043 | 8/1961 | Pettingill . |
| 3,336,530 | 8/1967 | Sloan et al. . |
| 3,589,337 | 6/1971 | Doss . |
| 3,608,524 | 9/1971 | Waltz . |
| 3,753,421 | 8/1973 | Peck . |
| 3,777,712 | 12/1973 | Gardner et al. ........................ 119/719 |
| 3,823,691 | 7/1974 | Morgan . |
| 3,980,051 | 9/1976 | Fury . |
| 4,136,338 | 1/1979 | Antenore ................................ 340/224 |
| 4,153,009 | 5/1979 | Boyle . |
| 4,202,293 | 5/1980 | Gonda et al. . |
| 4,335,682 | 6/1982 | Gonda et al. . |
| 4,399,432 | 8/1983 | Lunn . |
| 4,539,937 | 9/1985 | Workman . |
| 4,627,385 | 12/1986 | Vinci . |
| 4,733,633 | 3/1988 | Yarnall, Sr. et al. . |
| 4,794,402 | 12/1988 | Gonda et al. . |
| 4,802,482 | 2/1989 | Gonda et al. . |
| 4,918,432 | 4/1990 | Pauley et al. ......................... 340/573 |
| 4,996,945 | 3/1991 | Dix, Jr. ................................. 361/120 |
| 5,061,918 | 10/1991 | Hunter . |
| 5,067,441 | 11/1991 | Weinstein ............................. 340/573 |
| 5,272,466 | 12/1993 | Venczel ................................ 340/573 |

*Primary Examiner*—Thomas Price
*Attorney, Agent, or Firm*—Lowe, Price, LeBlanc & Becker

[57] ABSTRACT

Movement of an animal into a barrier region is inhibited by fitting on the animal a collar carrying a housing including battery powered circuitry for transmitting a magnetic induction wave. A compressional wave emitter in the region responds to the magnetic induction wave to emit a compressional wave that the animal senses and which inhibits its movement into the region.

26 Claims, 8 Drawing Sheets

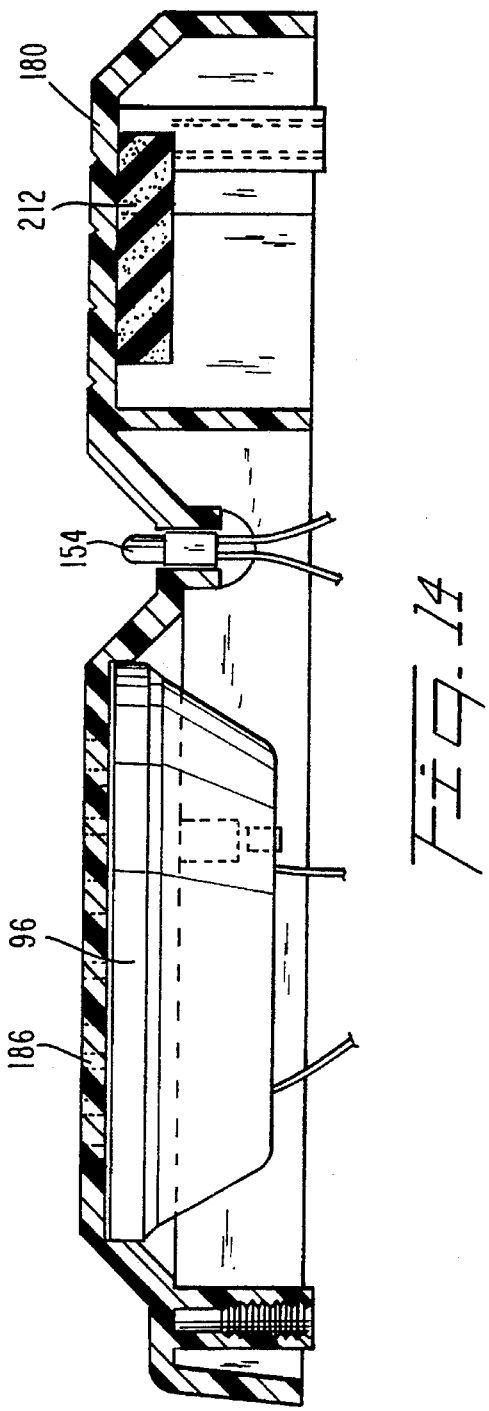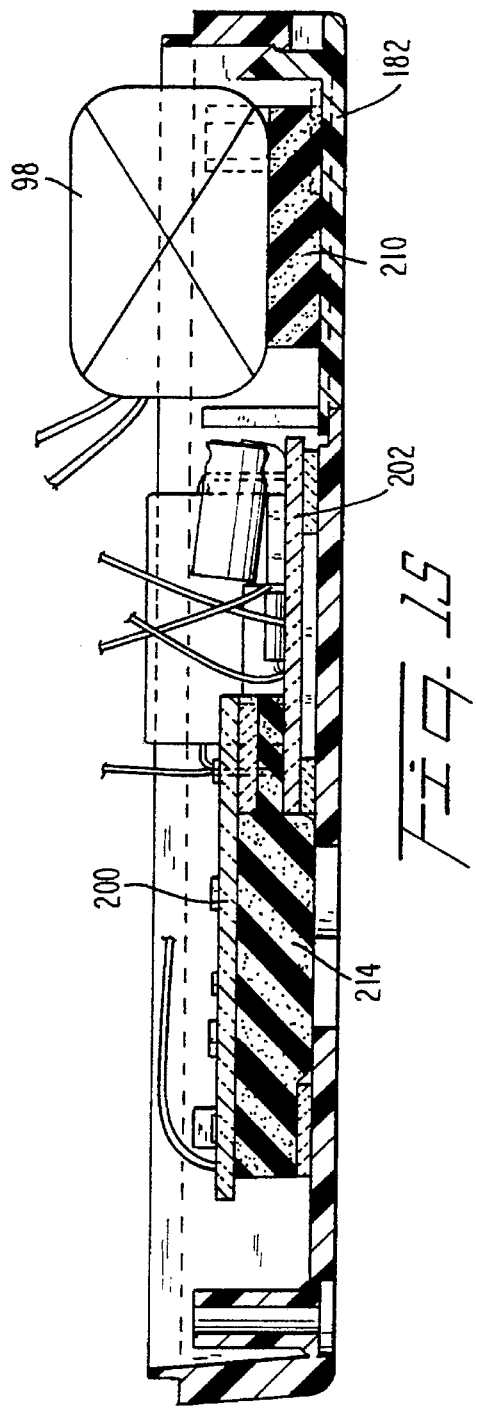

METHOD OF AND APPARATUS FOR TRAINING AN ANIMAL

FIELD OF INVENTION

The present invention relates generally to methods of and apparatus for training an animal, particularly for inhibiting movement of an animal into a barrier region, and more particularly to such a method and apparatus including at least one of the following features: (a) continuously transmitting from the animal a pulsed wave train which is received at a region spaced from the animal and causes a signal to be transmitted from the spaced region to the animal, (b) a compressional wave emitter in the barrier region responsive to a wave having a predetermined characteristic that is transmitted from the animal, (c) a housing on an animal collar including battery powered circuitry for transmitting a magnetic induction wave, or (d) a compressional wave source responsive to a magnetic induction wave having a predetermined characteristic.

BACKGROUND ART

It is often desirable to train an animal, particularly a pet, in various ways, particularly to inhibit movement of the animal through a barrier region. The prior art of which we are aware dealing with methods and apparatus for accomplishing this result are generally limited to outdoor situations. One currently marketed prior art system is disclosed by Peck, U.S. Pat. No. 3,753,421 wherein a signal emitting wire defines a barrier region; a similar system is disclosed by Yarnall et al., U.S. Pat. No. 4,733,633. In both of these systems, the animal whose movement is to be inhibited relative to the barrier region is equipped with a collar including a receiver responsive to a field derived from the wire. In response to the animal coming into the barrier region, where the wire is located, the receiver picks up a field transmitted from the wire, to trigger a circuit in the receiver, to administer an electric shock to the animal. It has been found that the electric shock is often ineffective to prevent the animal from entering and traversing the barrier region. In addition, the shock could be damaging, in various ways, to the animal. If a human, particularly a child, has the receiver in contact with his skin when he approaches the wire, the shock could be administered to the human. In use, the Peck et al. and Yarnall et al systems usually involve the considerable expense of installing a subterranean wire.

Another system for inhibiting movement of an animal, particularly at pet, into and/or through a barrier region is disclosed by Fury, U.S. Pat. No 3,980,051 wherein a trainer is provided with a first ultrasonic pulse transceiver and a second ultrasonic transceiver is worn by the animal. An ultrasonic pulse from the first transceiver is transmitted to the second transceiver. In response to the second transceiver receiving a pulse from the first transceiver, the second transceiver transmits a corresponding pulse back to the first transceiver. Round-trip transit time of the ultrasonic pulses from the first transceiver to the second transceiver and back to the first transceiver is measured at the first transceiver. In response to the round-trip transit time exceeding a predetermined duration, associated with the animal entering the barrier region, the first transceiver transmits an animal whistle sound. The animal whistle sound is designed to inhibit movement of the animal through the barrier region. A problem with the Fury system is that it is not well suited to confining an animal to a designated area because the transit time to one portion of the barrier region is likely to differ from the transit time to another portion of the barrier region.

Systems of the aforementioned types are not at all suited to indoor situations. It is frequently desirable to inhibit movement of pets in indoor locations, for example, to prevent dogs and cats from jumping onto beds, couches and chairs, or to inhibit movement of the pet into particular areas of a residence. The wires of the Peck and Yarnall, Sr. et al. arrangements are likely to be unsightly and obtrusive in a household situation. In addition, the coverage area of the wire system may be excessive for many household situations. The ultrasonic ranging approach disclosed by Fury is not well adapted for household situations because of the short distances frequently involved and because the ultrasonic energy is likely to be reflected from walls and other fixtures in the house, to cause anomalous responses.

It is, accordingly, an object of the present invention to provide a new and improved apparatus for and method of training an animal.

Another object of the present invention is to provide a new and improved method of and apparatus for inhibiting movement of an animal into a barrier region, particularly an indoor barrier region.

Another object of the invention is to provide a new and improved method of and apparatus for inhibiting indoor movement of an animal, wherein an inhibiting stimulus is supplied to the animal only when the animal is in close proximity to a barrier region.

THE INVENTION

In accordance with one aspect of the invention, a method of training an animal comprises continuously transmitting from the animal a pulsed wave train having a predetermined characteristic. In response to receipt in a region spaced from the animal of the pulsed wave train having the predetermined characteristic, a signal is transmitted from a region spaced from the animal to the animal. The transmitted signal causes a training stimulus to be applied to the animal.

In accordance with an additional aspect of the invention, an apparatus for training an animal comprises a first housing including (a) battery powered electronic circuitry for continuously transmitting a pulsed wave train having a predetermined characteristic and (b) structure for enabling the first housing to be mounted on the animal. A second housing adapted to be located in a region spaced from the animal includes a receiver for the pulsed wave train and a signal emitter coupled to the receiver for transmitting an output to the animal in response to the pulsed wave train having the predetermined characteristic being received by the receiver.

In accordance with a further aspect of the invention, a method of inhibiting movement of an animal into a barrier region comprises transmitting from the animal a wave having a predetermined characteristic. In response to receipt in the region of the wave having the predetermined characteristic, compressional wave energy is emitted from the region to the animal. The emitted compressional wave energy has a characteristic that can be detected by the animal and tends to prevent movement of the animal into the barrier region.

In a preferred embodiment, the wave transmitted from the animal is a magnetic induction wave, which is particularly advantageous for short range, indoor situations. To minimize battery requirements of a transmitter on the animal, the magnetic induction wave is shaped as relatively low duty cycle pulses continuously transmitted in bursts from the animal.

Another aspect of the invention involves the combination of a collar for an animal and a housing including battery powered electronic circuitry for transmitting a magnetic induction wave. The housing has a structure for enabling the housing to be carried on the collar.

A further aspect of the invention involves a housing including a receiver for a magnetic induction wave having a predetermined characteristic and a compressional wave energy emitter. In response to reception by the receiver of the induction wave having the predetermined characteristic, the emitter is activated to emit compressional wave energy. Preferably the emitted compressional wave energy has a characteristic that can be detected by an animal and tends to prevent movement of the animal into a barrier region adjacent the housing.

A further aspect of the invention is directed to an apparatus for inhibiting movement of an animal into a barrier region. The apparatus comprises a first housing including structure for enabling the first housing to be mounted on the animal. The first housing includes battery powered electronic circuitry for emitting a magnetic induction wave having a predetermined characteristic. A second housing adapted to be located in the region includes a receiver for the magnetic induction wave and a compressional wave energy emitter coupled to the receiver for emitting an output in response to the magnetic induction wave having the predetermined characteristic being received by the receiver. The emitted compressional wave energy has a characteristic that can be detected by the animal and tends to prevent movement of the animal into the barrier region.

In a preferred embodiment, the receiver includes a resonant circuit tuned to a carrier frequency for the transmitted magnetic induction pulses. The resonant circuit includes a coil for receiving the magnetic induction wave. The receiver and compressional energy wave emitter are preferably battery powered circuitry causing the emitter to derive the compressional wave energy as a pulsed wave train. The pulsed wave train includes a predetermined number of pulses followed by an interval substantially greater than the period between adjacent pulses of the pulse train to minimize battery drain. The pulsed wave train is repeated after the interval has elapsed while the coil is receiving the magnetic induction wave.

In accordance with an additional aspect of the invention, a method of inhibiting movement of an animal into a barrier region comprises transmitting from the animal a wave having a predetermined characteristic. In response to receipt in the region of the wave having the predetermined characteristic, compressional wave energy is emitted from the region to the animal. The emitted compressional wave energy has a characteristic that can be detected by the animal and tends to prevent movement of the animal into the barrier region.

In a preferred embodiment, the wave transmitted from the animal is a magnetic induction wave, which is particularly advantageous for short range, indoor situations. To minimize battery requirements of a transmitter on the animal, the magnetic induction wave is shaped as relatively low duty cycle pulses continuously transmitted in bursts from the animal.

Another aspect of the invention involves the combination of a collar for an animal and a housing including battery powered electronic circuitry for transmitting a magnetic induction wave. The housing has a structure for enabling the housing to be carried on the collar.

A further aspect of the invention involves a housing including a receiver for a magnetic induction wave having a predetermined characteristic and a compressional wave energy emitter. In response to reception by the receiver of the induction wave having the predetermined characteristic, the emitter is activated to emit compressional wave energy. Preferably the emitted compressional wave energy has a characteristic that can be detected by an animal and tends to prevent movement of the animal into a barrier region adjacent the housing.

A further aspect of the invention is directed to an apparatus for inhibiting movement of an animal into a barrier region. The apparatus comprises a first housing including structure for enabling the first housing to be mounted on the animal. The first housing includes battery powered electronic circuitry for emitting a magnetic induction wave having a predetermined characteristic. A second housing adapted to be located in the region includes a receiver for the magnetic induction wave and a compressional wave energy emitter coupled to the receiver for emitting an output in response to the magnetic induction wave having the predetermined characteristic being received by the receiver. The emitted compressional wave energy has a characteristic that can be detected by the animal and tends to prevent movement of the animal into the barrier region.

In a preferred embodiment, the receiver includes a resonant circuit tuned to a carrier frequency for the transmitted magnetic induction pulses. The resonant circuit includes a coil for receiving the magnetic induction wave. The receiver and compressional energy wave emitter are preferably battery powered circuitry causing the emitter to derive the compressional wave energy as a pulsed wave train. The pulsed wave train includes a predetermined member of pulses followed by an interval substantially greater than the period between adjacent pulses of the pulse train to minimize battery drain. The pulsed wave train is repeated after the interval has elapsed while the coil is receiving the magnetic induction wave.

While magnetic induction signalling has been extensively used in the past, e.g., it is currently being used to transmit heart rate information from a pulse monitor of a human to a receiver, use of such energy is particularly advantageous for inhibiting movement of an animal into or through an indoor barrier region. This is because the range of a magnetic induction wave is quite small, being limited to a maximum of two or three feet, which is an ideal situation for inhibiting movement of an animal into a room or onto furniture.

The above and still further objects, features and advantages of the present invention will become apparent upon consideration of the following detailed description of a specific embodiment thereof, especially when taken in conjunction with the accompanying drawings.

BRIEF DESCRIPTION OF THE DRAWING

FIG. 14 is a side sectional view of the structure included in the cover of the second housing; and FIG. 15 is a side sectional view of the structure included in the base of the second housing.

DESCRIPTION OF THE PREFERRED EMBODIMENT

Figure 1:
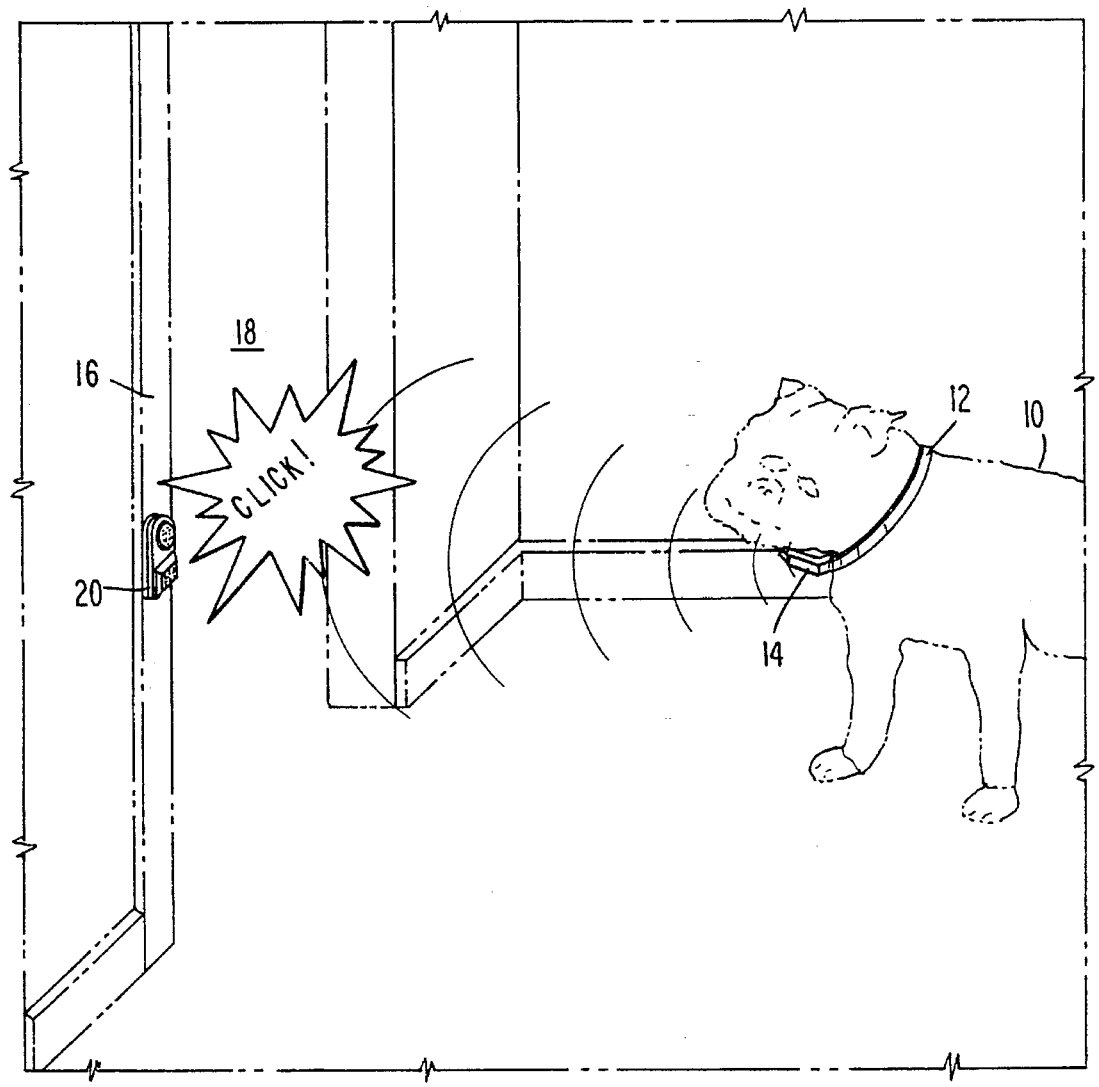
FIG. 1 is an illustration of a typical environmental situation incorporating the present invention.

Reference is now made to FIG. 1 of the drawing, wherein dog 10 is illustrated as wearing collar 12, which carries non-magnetic, preferably hard plastic, housing 14. Within housing 14 is a battery and battery-activated circuitry, including a coil for continuously transmitting to a region in close proximity to dog 10 magnetic induction wave pulses in bursts. Each pulse has a predetermined carrier frequency, determined by a resonant circuit in the battery powered circuitry. The duty cycle of the pulses transmitted from housing 14 is relatively low, such as 3 percent, to enable the battery to operate for many months without replacement.

To conserve energy of the battery in housing 12, the pulsed magnetic induction waves are derived from the housing in bursts. In one actual embodiment, each burst has a duration of approximately 60 milliseconds, followed by an inactive period of approximately 650 milliseconds. During the 60 millisecond burst period, there are derived approximately 150 sequential magnetic induction pulses, each having a carrier frequency of approximately 6 kHz derived. The pulses are spaced from each other by approximately 70 microseconds and reoccur approximately every 400 microseconds.

Mounted on door frame 16, adjacent doorway 18, is non-magnetic, preferably hard plastic housing 20. While housing 20 is equipped with structure, illustrated and discussed infra, enabling the housing to be mounted on door frame 16, the housing can be placed on furniture, such as beds, sofas, and chairs, or for outdoor short range situations in which the housing might be located proximate a patio, flower bed or under a fence the animal might attempt to go beneath. Housing 20 includes battery powered circuitry comprising a coil in a tuned circuit resonant to the frequency of the carrier for the pulses of the magnetic induction wave transmitted from housing 14. Housing 20 also includes an electric wave-compressional energy wave energy transducer which is activated when the tuned circuit in housing 20 is activated by the magnetic induction waves emitted from housing 14. The transducer in housing 20 emits compressional energy wave pulses having a carrier frequency that is easily detected by the ears of dog 10; the carrier is preferably at a frequency that does not have a very appreciable effect on humans.

When dog 10 gets sufficiently close to housing 20, to be in a barrier region adjacent housing 20 and doorway 18 (e.g. two or three feet), housing 20 emits several compressional wave energy pulses that are detected by the aural senses of dog 10. The compressional energy wave sensed by dog 10 tends to prevent the dog from moving further into the barrier region and through doorway 18 and causes him to retreat from the barrier region. Preferably, the compressional wave energy pulses emitted by housing 20 is in the form of a pulse wave train including, for example, three pulses spaced from each other by approximately 80 milliseconds. After the wave train has been emitted, a silent period occurs that is considerably in excess of 80 milliseconds. If dog 10 is still in the barrier region after the silent period has elapsed, a second series of compressional wave energy pulses is derived from housing 20. The amplitude and frequency of the compressional wave energy pulses derived from housing 20 are such that dog 10 tends to retreat from the barrier region when the compressional wave energy pulses are emitted from housing 20 and enables a single 9 volt alkaline battery to be used for many months. The pulsed nature of the compressional wave energy emitted from housing 20 reduces the battery requirements for the circuitry in housing 20.

In a preferred embodiment, the compressional wave energy emitted from housing 20 has a carrier frequency of approximately 15 kHz for three successive pulses, each having a duration of approximately 0.55 milliseconds; the period between adjacent leading edges of these three pulses is approximately 80 milliseconds. After the three pulses have been emitted, there is a silent period of approximately 365 milliseconds. If dog 10 is still in the barrier region after the 365 millisecond silent interval has elapsed, three additional pulses of the stated type are derived.

Figure 2:
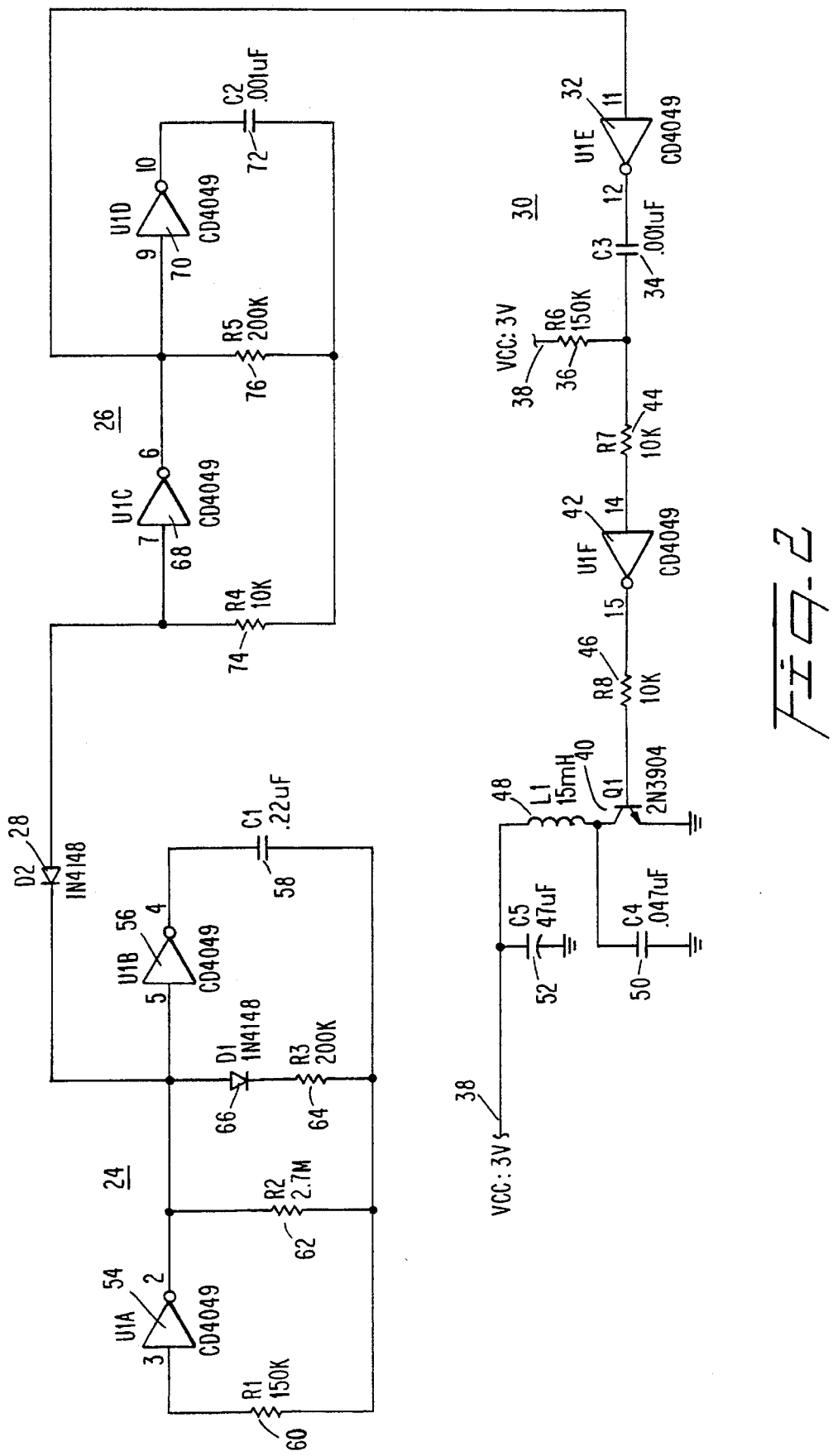
FIG. 2 is a circuit diagram of battery powered circuitry included in a first housing carried by the animal illustrated in FIG. 1.

The electronic circuitry included in housing 14 is illustrated in FIG. 2 as including low frequency oscillator 24 and high frequency oscillator 26, coupled to each other by diode 28. Oscillator 26 drives shaping circuit 30, comprising (1) inverter 32 and (2) a differentiator including series capacitor 34 and resistor 36 connected to +3 volt power supply terminal 38. Pulses derived from shaping circuit 30 are coupled to the base of npn transistor 40 via inverter 42, having resistors 44 and 46 respectively connected to input and output terminals thereof. The emitter collector path of transistor 40 is connected to ground and power supply terminal 38 via inductance coil 48; the emitter collector path of transistor 40 is also shunted by capacitor 50, having a value that is three orders of magnitude less than the capacitance of capacitor 52 that shunts power supply terminal 38 to ground.

Oscillator 24 includes inverters 54 and 56, connected in a feedback path including capacitor 58 and resistor 60. The common output terminal of inverter 54 and input terminal of inverter 56 are connected to first and second parallel branches respectively including resistor 62 and the series combination of resistor 64 and diode 66. Oscillator 26 includes inverters 68 and 70, connected to each other in a feedback path including capacitor 72 and resistor 74. The common output terminal of inverter 68 and input terminal of inverter 70 are connected to one terminal of resistor 76, having a second terminal connected to a common terminal for capacitor 72 and resistor 74.

In the preferred embodiment, oscillator 24 has a frequency of 1.4 Hz, i.e., a period of approximately 714 milliseconds, and derives rectangular waves that enable and disable operation of oscillator 26 for 60 and 654 millisecond intervals during each 714 millisecond period of oscillator 24. During the 60 millisecond interval, oscillator 26 derives a rectangular wave having a 400 microsecond period. The rectangular wave derived by oscillator 26 is shaped by shaper 30 and coupled to inverter 42 so that the base of transistor 40 is forward biased for a 70 microsecond interval during each 400 microsecond period. While oscillator 26 is disabled by oscillator 24, the base of transistor 40 is cut off by the output of inverter 42.

As a result of the pulses which forward bias the base of transistor 40, oscillatory current flows through coil 48 at a frequency (6 kHz) determined by the inductance of coil 48, the capacitance of capacitor 50, and to a much lesser extent, the capacitance of capacitor 52. In response to the oscillatory current flowing through the tuned circuit including coil 48 and capacitor 50, a magnetic induction wave is transmitted from coil 48. The magnetic induction wave is thus a series of pulses which occur in bursts during the 60 millisecond intervals. The pulses have a carrier frequency of 6 kHz and a low duty cycle, considering that each burst occurs only approximately 10 percent of the time and that current flows through coil 48 for only a portion of the burst period. When dog 10 is close to housing 20, i.e., within the two-three foot barrier region surrounding housing 20, the magnetic induction wave transmitted from coil 48 propagates through housing 14 to detection circuit in housing 20.

In the preferred embodiment, inverters 32, 42, 54, 56, 68 and 70 are included in a single integrated circuit chip mounted on a printed circuit board in housing 14. The chip includes a power supply terminal (not shown) connected to battery power supply terminal 38. The remaining components of the circuit are mounted on the printed circuit board and connected to be powered by the battery voltage at terminal 38; preferably, the battery is a lithium, disc shaped battery.

Figure 3:
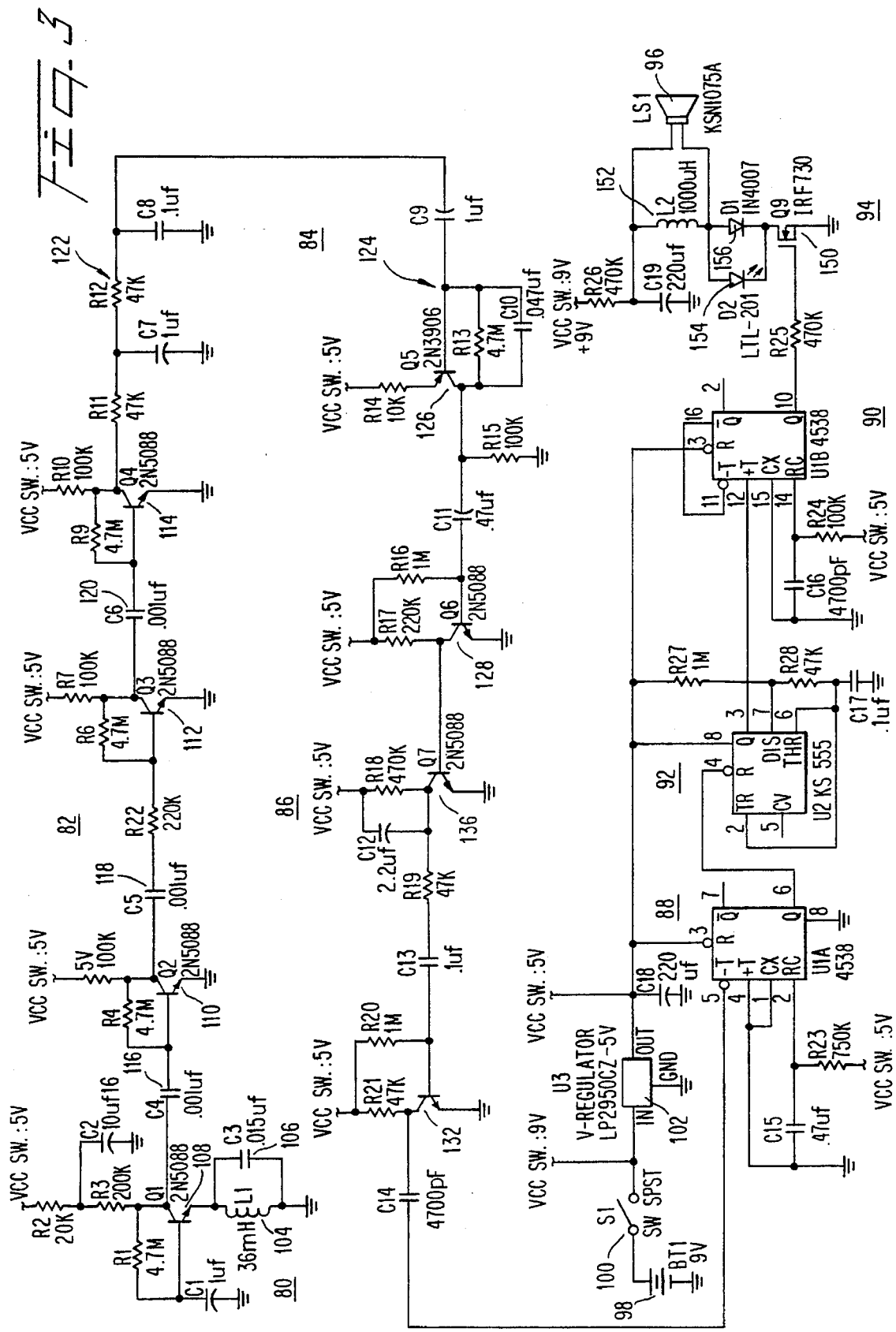
FIG. 3 is a circuit diagram of circuitry included in a second housing for emitting a compressional energy wave in response to an animal carrying the first housing coming into a barrier region where the second housing is located.

A circuit diagram of the circuitry included in housing 20 is illustrated in FIG. 3 as including magnetic induction wave detector 80, three stage AC, resistance-capacitance coupled inverter 82, bandpass filter 84, wave shaper 86, integrated circuit monostable multivibrators 88 and 90, integrated circuit low power CMOS timer 92 and output circuit 94 including speaker or tweeter 96 which emits compressional energy wave pulses that are transmitted from housing 20 to dog 10 and tend to prevent entry of the dog into a barrier region where housing 20 is located, i.e., speaker 96 emits a wave that tends to inhibit movement of dog 10 into the area adjacent housing 20.

Monostable multivibrators 88 and 90 are included together in a single integrated circuit package. Each of CMOS timer 92 and regulator 102 is included in its own separate integrated circuit package. The remaining components illustrated in FIG. 3 are discrete components, with speaker 96 preferably being a bimorph tweeter. All of the discrete and integrated circuit components illustrated in FIG. 3 are mounted on two printed circuit boards in housing 20, except for tweeter 96, which is mounted in the housing behind an appropriate screen structure.

The circuitry of FIG. 3 is energized by a battery, preferably a nine volt alkaline battery 98, of a type used in transistor radio receivers. The positive electrode of battery 98 is selectively applied to output circuit 94 through switch 100 when the switch is closed during normal operation. The remaining circuitry in housing 20 is powered by the five volt output of regulator 102, having an input coupled to the positive electrode of battery 98 via closed switch 100. Regulator 102 is used because, in many instances, output circuit 94 has a tendency to reduce the voltage applied by battery 98 to the remaining circuits to a low enough level that causes energization of output circuit 94 when a magnetic field is no longer coupled to detector 80.

Detector 80 includes a tank circuit comprised of the parallel combination of coil 104 and capacitor 106; the tank circuit has a resonant frequency approximately equal to the frequency of the 6 kHz magnetic induction wave transmitted from coil 48, FIG. 2. The tank circuit comprising coil 104 and capacitor 106 is connected to the emitter of npn transistor 108, having base and collector circuitry coupled to the regulated five volt output of regulator 102. At the collector of transistor 108 bursts of pulses having a carrier frequency of 6 kHz are derived when dog 10 is in the barrier region, approximately two-three feet from coil 104 in housing 20. The pulses at the collector of transistor 108 are a replica of the pulses derived from housing 14 and amplified by npn transistors 110, 112 and 114 of AC amplifier 82. The bases of transistors 110, 112 and 114 are AC coupled to the preceding stages by series capacitors 116, 118 and 120, respectively.

The pulse bursts at the collector of transistor 114, having a carrier frequency of 6 kHz, are coupled through bandpass filter 84, including lowpass section 122 and highpass section 124. Bandpass filter 84 has a center frequency of approximately 6 kHz, a result achieved by proper selection of the cutoff frequencies of lowpass and highpass sections 122 and 124. Highpass filter section 124 is connected to transistor 126, having an output which is supplied to cascaded npn transistors 128, 130 and 132. The pulses having the 6 kHz carrier supplied to transistor 126 are converted by the circuitry connected to transistors 126–132 into a square wave having a 50 percent duty cycle; the square wave is derived at the collector of transistor 132. The square wave at the collector of transistor 132 is derived while magnetic induction wave having a 6 kHz carrier frequency is received by detector 80.

Monostable multivibrator 88 is connected to a resistor and capacitor such that in response to a negative going edge of the voltage at the collector of transistor 132, the monostable derives a square wave having a 720 millisecond period and a 50 percent duty cycle. During alternate 360 millisecond half cycles of the output of monostable multivibrator 88, timer 92 is enabled; the timer is disabled during the remaining 360 millisecond half cycles of the output of monostable multivibrator 88. While enabled by the output of monostable multivibrator 88, timer 92 derives three pulses, each having a leading edge that is separated from the adjacent pulse by 80 milliseconds. The resulting sequence of three pulses derived by timer 92 enables monostable multivibrator 90 to derive pulses having a width of 0.55 milliseconds. Hence, each time a magnetic induction pulse having a 6 kHz carrier is transmitted from coil 48 to coil 104 and capacitor 106, monostable 90 derives a pulsed wave train including three 0.55 millisecond pulses, having leading edges spaced from each other by 80 milliseconds. These three pulses are followed by an inactive period of 360 milliseconds.

In response to each 0.55 millisecond pulse derived by monostable multivibrator 90, the gate of field effect transistor (FET) 150 is forward biased, causing current to flow from the positive terminal of battery 98 through switch 100 to the electrodes of tweeter 96 and the source drain path of FET 150. Tweeter 96 is, to a certain extent, a capacitance reactance, which, in combination with coil 152, forms a tuned circuit having a resonant frequency of approximately 15 kHz. Tweeter thereby derives a compressional energy wave having a carrier frequency of 15 kHz. The compressional wave is in the form of three pulses, each having a duration of approximately 0.55 milliseconds. There is approximately 80 milliseconds between the leading edges of adjacent compressional energy wave pulses emitted by tweeter 96. The three pulses are followed by a silent period of approximately 320 milliseconds.

To provide a visual indication of the condition of battery 98, light emitting diode (LED) 154 is connected in series with the source drain path of field effect transistor 150, and in parallel with blocking diode 156. Light emitting diode 154 is forward biased, into a light emitting state in synchronization with the compressional wave, provided the voltage of battery 98 is sufficiently high to power the described circuitry in housing 20.

Figure 4:
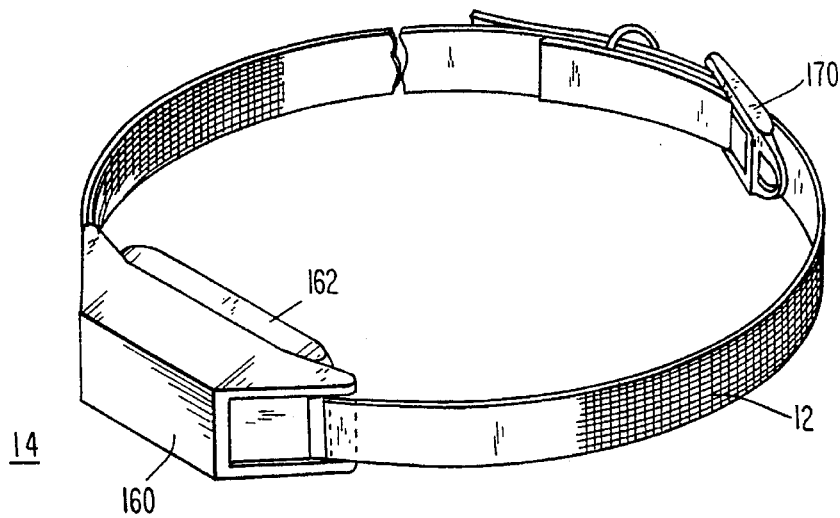
FIG. 4 is a perspective view of the first housing and a collar adapted to be placed on the animal illustrated in FIG. 1.
Figure 5:
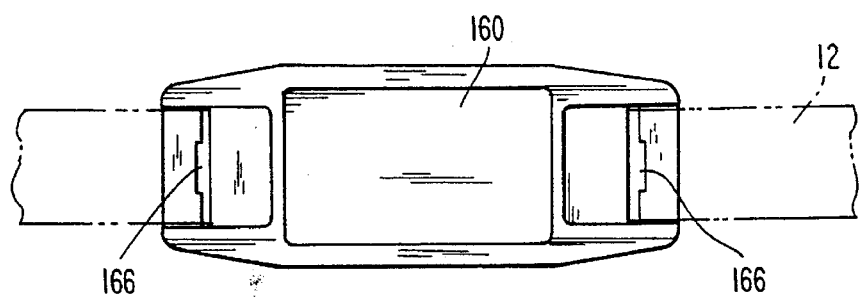
FIG. 5 is a top view of the first housing.
Figure 6:
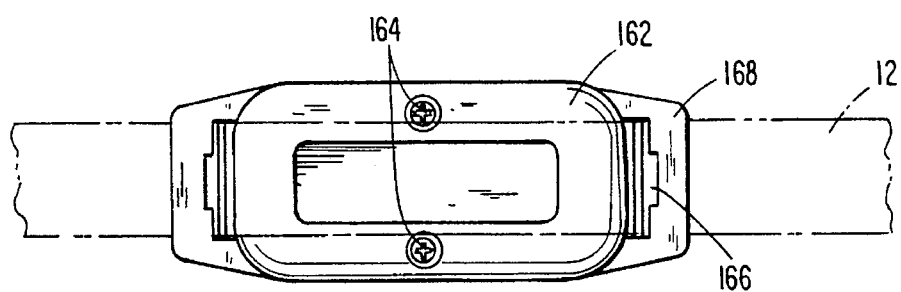
FIG. 6 is a bottom view of the first housing.
Figure 7:
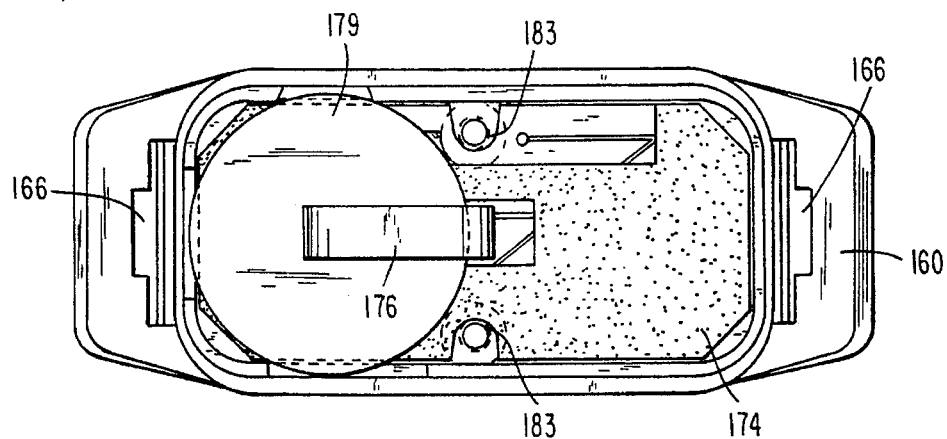
FIG. 7 is a top view of the first housing with the cover removed.

Reference is now made to FIGS. 4–6 wherein housing 14 is illustrated in detail as including matching cover 160 and base 162. Cover 160 has a trapezoidal, elevational cross section and is secured to rectangular base 162 by two screws 164 which project through the base into threaded cylindrical bores in cover 160. Strap 12 fits into transverse slots 166 at opposite ends of base 162 so that the strap extends behind a center portion of the base and in front of ears 168, at opposite ends of the cover. Cover 160 and base 162 are fabricated of a non-magnetic, hard, lightweight molded plastic so that magnetic induction fields or waves derived from circuitry within housing 14 can propagate unhindered to the exterior of the case. Strap 12 is provided with a conventional latch 170, so that the strap or collar can be fitted onto dog 10.

Figure 8:
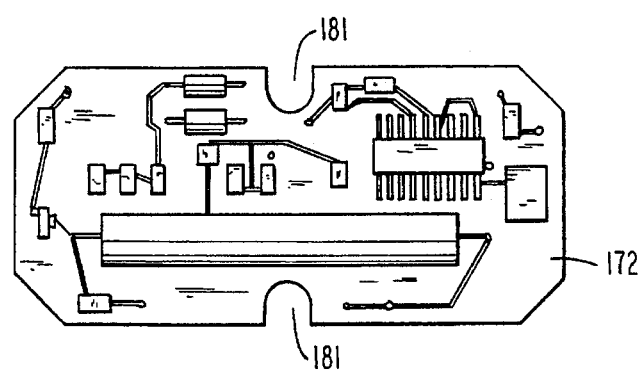
FIG. 8 is a top view of a printed circuit board included in the first housing.
Figure 9:
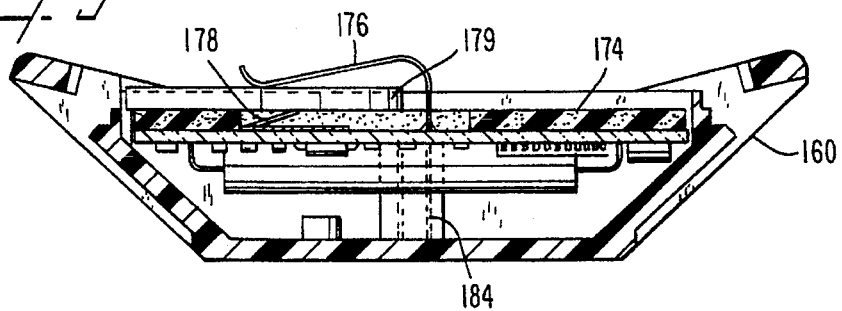
FIG. 9 is a side sectional view of the first housing.
Figure 10:
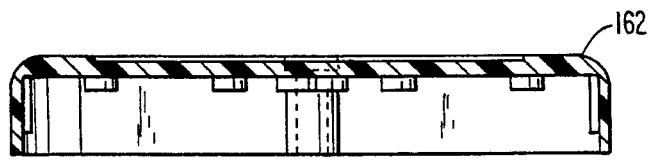
FIG. 10 is a side sectional view of the cover for the first housing.

Fixedly mounted in cover 160 is printed circuit board 172, FIGS. 8 and 9, on which are mounted the components schematically illustrated in FIG. 2. Sponge 174 is fixedly secured to the backside of printed circuit board 172, i.e., the face of the printed circuit board opposite from the face of the printed circuit board that carries the electronic components. The backside of printed circuit board 172 carries spring contacts 176 and 178 that engage opposite polarity faces of lithium, disc shaped battery 179. Contacts 176 and 178 connect the opposite polarity electrodes of battery 179 to power supply terminals of the electronic circuitry carried by printed circuit board 172. Battery 179 is positioned in cover 160 at a location enabling the battery to be immediately adjacent cover 162. Thereby, battery 179 can easily be replaced when cover 162 is detached from base 160 by removal of screws 164. Screws 164 fit into slots 181 in the center of printed circuit board 172, to assist in holding the printed circuit board in situ. Screws 164 fit into a pair of cylindrical bores in post 183, carried by the roof of cover 160.

Figure 11:
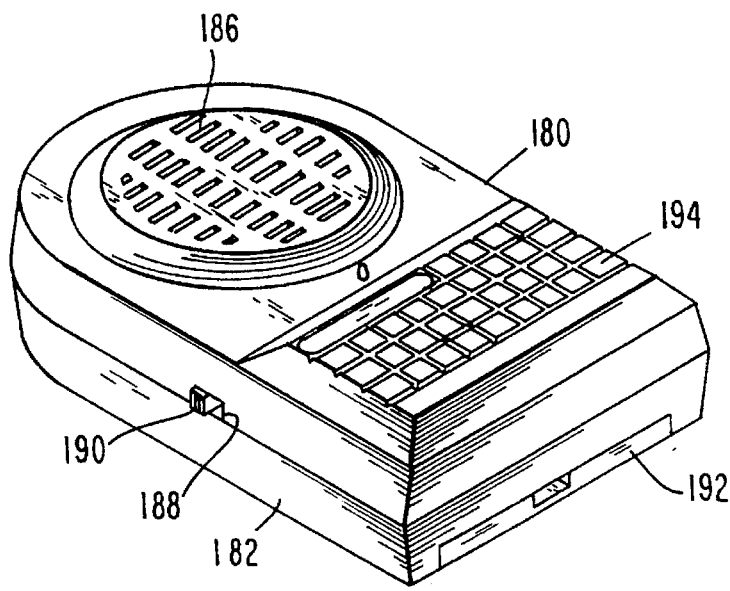
FIG. 11 is a top perspective view of the second housing.
Figure 12:
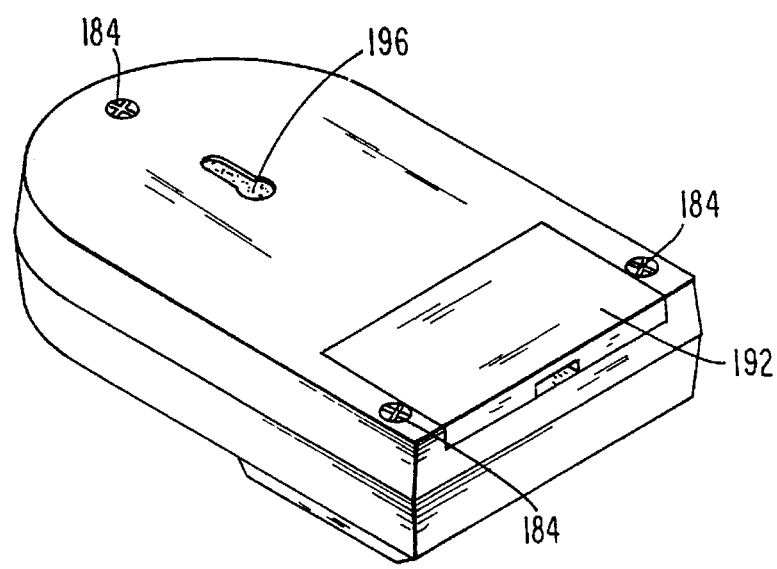
FIG. 12 is a bottom perspective view of the second housing.

Reference is now made to FIGS. 11 and 12 wherein housing 20 is illustrated as including mating cover 180 and base 182, secured together by three screws 184. Cover 180 and base 182 have a somewhat rectangular shape, with semicircular end portions, to facilitate mounting and for appearance purposes. Cover 180 and base 182 are fabricated of hard, lightweight, non-magnetic plastic so that the magnetic induction waves transmitted from housing 14 can pass unhindered to the circuitry within housing 20.

Cover 182 includes an upper circular perforated, screen-like region 186, behind which speaker 96 is mounted. Light emitting diode 154 projects through an aperture in cover 182, immediately below perforated region 186. Cover 180 also includes slot 188 through which slide 190, for switch 100, projects. Towards the bottom of base 180 is door 192 for permitting insertion and removal of a 9 volt alkaline battery. The upper, central portion of base 182 includes elongated, vertically extending slot 196 which enables housing 20 to be hung by any suitable means, such as a nail, screw or picture hook, on door frame 16.

Figure 13:
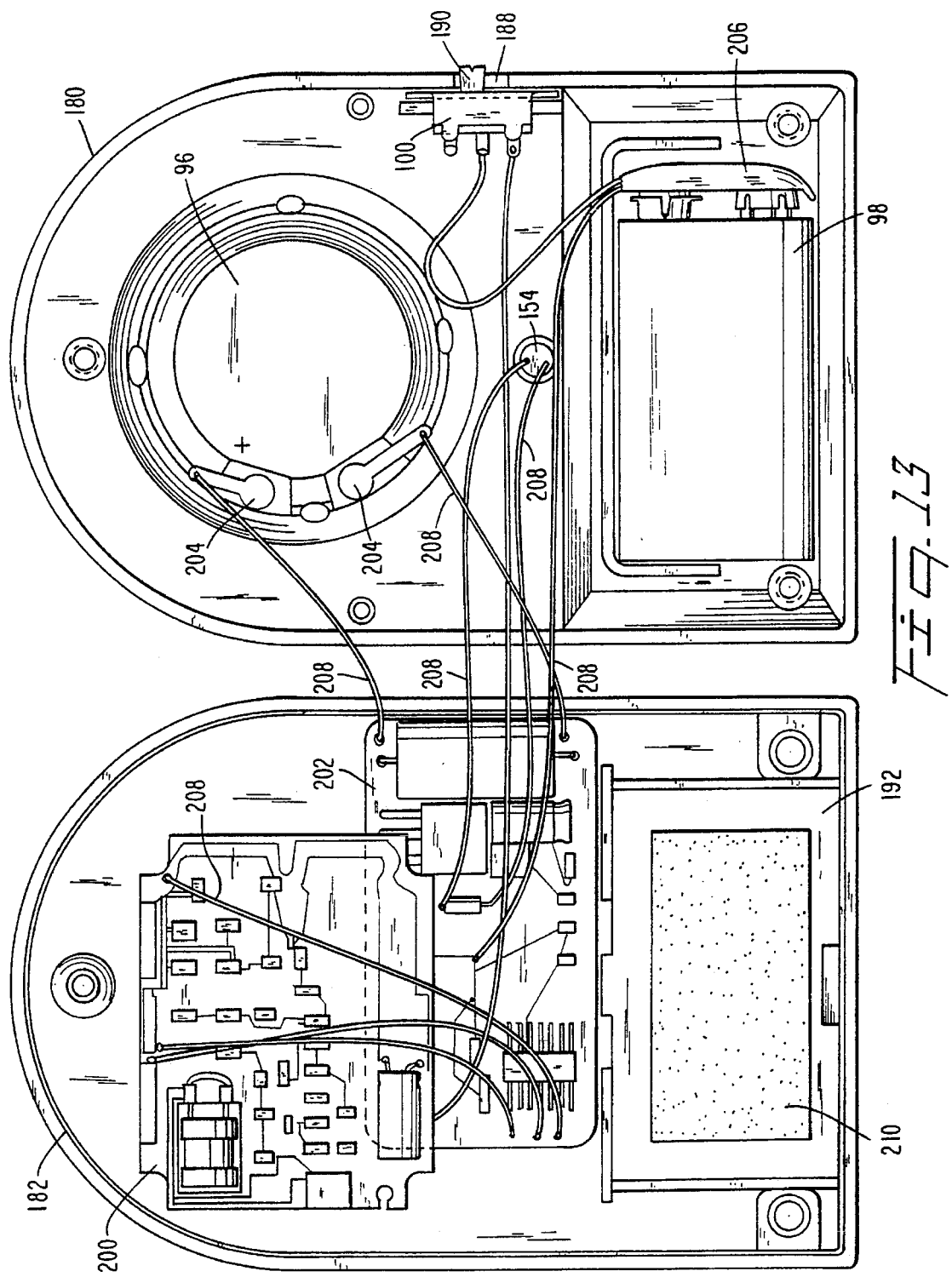
FIG. 13 is a view of the interior of the structure included in the second housing.

As illustrated in FIGS. 13 and 15, base 182 carries printed circuit boards 200 and 202, which lie in mutually parallel planes and on which are mounted the components schematically illustrated in FIG. 3. The circuitry on printed circuit boards 200 and 202 is connected by wires 208 to each other, to terminals 204 of speaker 96, to LED 154, to switch 100 and to connector 206 for battery 98. Sponges 210 and 212 in base 182 and cover 180 are positioned to abut against opposite faces of the battery and help to hold the battery in place. Base 182 includes sponge 214 on which is mounted printed circuit board 200. Cover 180 and base 182 include mating cylinders having mating bores. The cylindrical bores of cover 180 are threaded to receive screws 184, to enable the screws to hold the cover to the base.

While there has been described and illustrated one specific embodiment of the invention, it will be clear that variations in the details of the embodiment specifically illustrated and described may be made without departing from the true spirit and scope of the invention as defined in the appended claims. For example, in certain situations optical or radio energy can be continuously emitted as a pulsed wave train from a housing on the animal or such energy can be transmitted to the animal in lieu of compressional wave energy. In addition, the housing on the animal can include a transducer responsive to the wave transmitted to the animal and cause a stimulus, e.g. a shock, to be administered to the animal for training purposes. The animal could be trained for other purposes, e.g. to sit, in response to the stimulus.

We claim:

1. A method of inhibiting movement of an animal into a barrier region comprising transmitting from a source on the animal a wave having a predetermined characteristic, and emitting compressional wave energy from the region to the animal in response to receipt in the region of the wave having the predetermined characteristic, the emitted compressional wave energy having a characteristic that can be detected by the animal and when detected by the animal tends to prevent movement of the animal into the barrier region.

2. The method of claim 1 wherein the wave transmitted from the source on the animal is a magnetic induction wave.

3. The method of claim 2 wherein the magnetic induction wave is shaped as pulses continuously transmitted in bursts from the animal.

4. The method of claim 1 wherein the wave transmitted from the source on the animal is shaped as pulses.

5. The method of claim 4 wherein the pulses are continuously transmitted in bursts.

6. In combination, a housing, the housing including a receiver for a magnetic induction wave having a predetermined characteristic and a compressional wave energy emitter, the emitter being activated in response to reception by the receiver of the induction wave having the predetermined characteristic for emitting compressional wave energy.

7. The combination of claim 6 wherein the emitted compressional wave energy has a characteristic that can be detected by an animal and tends to prevent movement of the animal into a barrier region adjacent the housing.

8. The combination of claim 6 wherein the predetermined characteristic is frequency.

9. The combination of claim 8 wherein the receiver includes a resonant circuit tuned to a predetermined frequency, the predetermined frequency being the predetermined characteristic, the resonant circuit including a coil for receiving the magnetic induction wave.

10. The combination of claim 9 wherein the housing further includes circuitry connected between the compressional energy wave emitter and an output derived by the resonant circuit in response to a magnetic induction wave having the predetermined frequency being received by the coil, the circuitry and compressional energy wave emitter being battery powered, the circuitry being connected to respond to the output and supplying to the emitter a pulse train for causing the emitter to derive the compressional wave energy each time a pulse of the pulse train is derived, the pulse train including a predetermined number of pulses followed by an interval substantially greater than the period between adjacent pulses of the pulse train, the pulse train being repeated after the interval has elapsed while the coil is receiving the magnetic induction wave.

11. The combination of claim 6 wherein the housing includes means for enabling the housing to be hung by a generally horizontally extending shaft.

12. The combination of claim 8 wherein the receiver includes circuitry for deriving an output in response to a magnetic induction wave having the predetermined characteristic being received by the receiver, the circuitry and compressional energy wave emitter being battery powered, the circuitry being connected to respond to the output and supplying to the emitter a pulse train for causing the emitter to derive the compressional wave energy each time a pulse of the pulse train is derived, the pulse train including a predetermined number of pulses followed by an interval substantially greater than the period between adjacent pulses of the pulse train, the pulse train being repeated after the interval has elapsed while the coil is receiving the magnetic induction wave.

13. Apparatus for inhibiting movement of an animal into a barrier region comprising a first housing including structure for enabling the first housing to be mounted on the animal, the first housing including battery powered electronic circuitry for emitting a magnetic induction wave having a predetermined characteristic; a second housing adapted to be located in the region, the second housing including a receiver for the magnetic induction wave and a compressional wave energy emitter coupled to the receiver for emitting an output in response to the magnetic induction wave having the predetermined characteristic being received by the receiver, the emitted compressional wave energy having a characteristic that can be detected by the animal and tends to prevent movement of the animal into the barrier region.

14. The apparatus of claim 13 wherein the magnetic induction wave is shaped as pulses having a carrier frequency, the carrier frequency being the predetermined characteristic.

15. The apparatus of claim 14 wherein the receiver includes a resonant circuit tuned to the predetermined frequency, the resonant circuit including a coil for receiving the magnetic induction wave.

16. The apparatus of claim 15 wherein the receiver and emitter are battery powered circuitry causing the emitter to derive the compressional wave energy as a pulsed wave train, the pulsed wave train including a predetermined number of pulses followed by an interval substantially greater than the period between adjacent pulses of the pulsed wave train, the pulse train being repeated after the interval has elapsed while the coil is receiving the magnetic induction wave.

17. A method of training an animal comprising continuously transmitting from a source on the animal a pulsed wave train having a predetermined characteristic, and transmitting a signal from a region spaced from the animal to the animal in response to receipt in the region spaced from the animal of the pulsed wave train having the predetermined characteristic, the transmitted signal causing a training stimulus to be applied to the animal.

18. The method of claim 17 wherein the pulsed wave train transmitted from the animal is a magnetic induction wave.

19. The method of claim 17 wherein the signal transmitted from the region comprises a compressional wave that can be detected by the animal.

20. Apparatus for training an animal comprising a first housing including structure for enabling the first housing to be mounted on the animal, the first housing including battery powered electronic circuitry for continuously transmitting a pulsed wave train having a predetermined characteristic; a second housing adapted to be located in a region spaced from the animal, the second housing including a receiver for the pulsed wave train and a signal emitter coupled to the receiver for transmitting an output to the animal in response to the pulsed wave train having the predetermined characteristic being received by the receiver.

21. The apparatus of claim 20 wherein the signal has a characteristic that can be detected by the animal.

22. The apparatus of claim 21 wherein the signal comprises a compressional energy wave.

23. The apparatus of claim 20 wherein the pulsed wave train comprises a magnetic induction wave.

24. A method of inhibiting entry of an animal into a region within a building comprising emitting an energy field from the animal, placing a housing including a detector for the energy field in the region within the building, receiving the energy field at the detector when the animal enters the region, emitting from the housing compressional wave energy when the energy field is received by the detector, the compressional wave energy having a characteristic that can be acoustically detected by the animal and which inhibits entry of the animal into the region.

25. The method of claim 24 wherein the compressional wave energy has an ultrasonic frequency so it can be acoustically detected by the animal but cannot be acoustically detected by humans.

26. The method of claim 24 wherein the energy field is inductive.

\* \* \* \* \*